United States Patent
Jansson (10) Patent No.: US 9,641,672 B2
(45) Date of Patent: May 2, 2017

(54) MULTIMEDIA COMMUNICATION (71) Applicant: Mikael Jansson, Uppsala (SE)

(72) Inventor: Mikael Jansson, Uppsala (SE)

(73) Assignee: Mikael Jansson, Uppsala (SE)

( * ) Notice: Subject to any disclaimer, the term of this patent is extended or adjusted under 35 U.S.C. 154(b) by 0 days.

(21) Appl. No.: 14/623,795

(22) Filed: Feb. 17, 2015

(65) Prior Publication Data

US 2015/0163347 A1 Jun. 11, 2015

Related U.S. Application Data

(63) Continuation-in-part of application No. 13/524,388, filed on Jun. 15, 2012, now abandoned.

(60) Provisional application No. 61/497,628, filed on Jun. 16, 2011.

(51) Int. Cl.
*H04M 1/00* (2006.01)
*H04M 3/02* (2006.01)
*H04M 3/42* (2006.01)
*H04L 29/06* (2006.01)
*H04M 19/04* (2006.01)

(52) U.S. Cl.
CPC .............. *H04M 3/02* (2013.01); *H04L 65/40* (2013.01); *H04M 3/42042* (2013.01); *H04M 19/04* (2013.01); *H04M 3/42059* (2013.01)

(58) Field of Classification Search
CPC .................................................... H04M 3/42
See application file for complete search history.

(56) References Cited

U.S. PATENT DOCUMENTS

| | | | |
|---|---|---|---|
| 2008/0101588 A1* | 5/2008 | Bruce | H04M 1/578 379/373.01 |
| 2009/0061901 A1* | 3/2009 | Arrasvuori | G06Q 30/00 455/456.3 |
| 2010/0061540 A1* | 3/2010 | Dickens | H04M 1/575 379/207.16 |
| 2010/0125795 A1 | 5/2010 | Yu et al. | |
| 2011/0165841 A1* | 7/2011 | Baek | H04L 67/10 455/41.2 |
| 2012/0002796 A1 | 1/2012 | Wang et al. | |
| 2012/0224316 A1 | 9/2012 | Shulenberger | |

* cited by examiner

*Primary Examiner* — Mohammed Rachedine
(74) *Attorney, Agent, or Firm* — Renner, Otto, Boisselle & Sklar, LLP (57) ABSTRACT

A method for generating multimedia information in a mobile communication device, comprising the steps of:
receiving and processing an incoming or outgoing call;
in an analyzer, looking up call information for providing multimedia information associated with a particular call;
inputting the multimedia information associated with said particular call into a multimedia information processor module; and
by means of the processor module outputting the multimedia information in dependence of said particular call to a multimedia communication interface layer configured to provide multimedia communication, the processor module being configured to generate the multimedia communication interface layer as an overlay on top of or as an underlay under any other application or screen of the mobile communication device.

17 Claims, 9 Drawing Sheets

FIG. 4c
Instant text messaging

FIG. 4b
Instant picture messaging

FIG. 4a
Instant video messaging

MULTIMEDIA COMMUNICATION

RELATED APPLICATION DATA

This application is a continuation-in-part of U.S. patent application Ser. No. 13/524,388 filed Jun. 15, 2012, which claims the benefit of U.S. Provisional Application No. 61/497,628 filed Jun. 16, 2011, all of which are hereby incorporated herein by reference.

FIELD OF THE INVENTION

The present invention relates to multimedia communication. More specifically, the present invention relates to a method for multimedia communication such as multimedia messaging in a mobile communication device. The present invention is also related to a computer application program for a mobile communication device for implementing the method(s), as well as a mobile communication device provided with the computer application program product as well as a mobile communication system for implementing the method.

BACKGROUND OF THE INVENTION

Today, a user of a mobile communication device such as a mobile telephone, a smart phone or a tablet can select a personalized ringtone to be played on his/her mobile communication device when a particular caller calls the user instead of a default ring tone, the latter typically provided by the mobile communication device manufacturer. There are also a number of service providers that produces and distributes means for allowing a user to generate and/or create personalized ring tones on his/her mobile communication device, which may be triggered by a particular caller calling the user.

Recently, multimedia has found a use on mobile communication devices such that a video clip can be associated with a particular caller, and played when a call is received from the caller. Typically, a caller can only be associated with a video clip that is downloaded to the phone by the user himself/herself. It is known to play a video clip at the same time the ring tone is created when a caller calls the mobile communication device, which is known as a "personalized" ring tone. Normally, the personalized ring tone is stored locally only on the device.

Today, a variety of multimedia messaging services such as short message services, sms, multimedia message services, mms, e-mail etc. are known. Typically, only one type of service can be handled at the same time. Thus, for instance it is only possible to use an e-mail service but not also an sms service at the same time.

SUMMARY OF THE INVENTION

An aspect of the present invention is to provide a method for providing multimedia communication, such as messaging in a mobile communication device, wherein multimedia information is presented to an end-user of the mobile communication device in a multimedia communication interface layer. The multimedia communication interface layer can be provided for instance as an over-layer on top of or as an under-layer under any other application or screen of the mobile communication device.

According to an embodiment of the present invention, there is provided a method for generating multimedia information in a mobile communication device. The method comprises the steps of:

processing an incoming call from a caller and/or an outgoing call to a called party;

in an analyzer, looking up call information for providing multimedia information associated with a particular call;

inputting the multimedia information associated with said particular call into a multimedia information processor module; and by means of the processor module outputting the multimedia information in dependence of said particular call to a multimedia communication interface layer configured to provide multimedia communication. The processor module is configured to generate the multimedia communication interface layer as an over-layer on top of or as an under-layer under any other application or screen, such as home screen, of the mobile communication device.

According to an embodiment of the present invention, there is also provided a mobile communication device, which comprises a communication interface configured to process an incoming call from a caller and process, including transmitting, a call to a called party via a mobile communication system. The mobile communication device further comprises an analyzer configured to look up call information for providing multimedia information associated with a particular call or caller, a multimedia information processor module configured to output the multimedia information in dependence of said particular call to a multimedia communication interface layer configured to provide multimedia communication. The processor module is configured to generate the multimedia communication interface layer as an overlay on top of or as an under-layer under any other application or screen of the mobile communication device.

According to an aspect, the invention provides a mobile video platform of choice for widely and shared interests, delivering shared video clips straight to the mobile communication devices such as smart phones of the users via the multimedia communication interface as an overlay on top of or as an under-layer under any other application or screen of the mobile communication device.

According to an embodiment of the present invention, the multimedia communication interface layer is configured to provide instant multimedia messaging as an over-layer on top of any other application or screen of the mobile communication device. The over-layer may be configured to cover part of or the entire underlying screen of the mobile communication device.

According to an embodiment of the present invention, the multimedia communication interface layer is configured to provide instant multimedia messaging as an under-layer on top of any other application or screen of the mobile communication device. In this way, a video such as a commercial can be shown running under the ordinary screen and icons thereon of the mobile communication device. The user may then see the video at the same time he/she is using the mobile communication device for other purposes.

According to an embodiment of the present invention, the multimedia communication interface layer provided by the multimedia information processor module is configured to provide instant multimedia messaging as an overlay such as an over-layer on top of any other application or screen of the mobile communication device.

According to another embodiment of the present invention, the multimedia communication interface layer provided by the multimedia information processor module is configured to provide instant multimedia messaging as an underlay such as an under-layer under any other application or screen of the mobile communication device.

Typically, the multimedia communication interface layer is configured to provide instant multimedia messaging. In this way, the communication interface layer can be used for communicating directly and instantly with another party, which provides rapid communication without a need to start another, in this context "slower", messaging application such as e-mail. It is also possible for a user to decide instantly to handle multimedia presented in the multimedia communication layer, for instance to answer a video call message or not directly in this multimedia communication layer.

Herein, the term "multi-media information" includes: video ring-signals, video, video messaging, picture messaging, text messaging or any combination thereof, combining text, images, multiple images in sequence, with or without sound.

In some embodiments the multi-media message is associated with a call, from a caller, sometimes also associated with similarity data. The similarity data identifies other video ring tones, typically sequences that are similar to the video ring tone associated with the caller. In these embodiments the method comprises selecting one of the similar video sequences from the video sequences or identified by the similarity data.

The method is typically implemented by means a computer program product, such as a computer program application product, often referred to as an "app" comprising in a computer executable code means, when loaded into the computer to perform the method. The mobile communication devices of today typically comprise memory/memories and processor(s) suitable for implementing the features of the inventive method. The invention can be achieved in all types of mobile communication devices such as mobile phones, in particular so-called "smart phones", PDA:s, tablets or the like.

This method and device according to the various embodiments of the present invention is typically used for instant messaging purposes, which will be described later on.

BRIEF DESCRIPTION OF THE DRAWINGS

The features and advantages of the present invention will become further apparent from the following detailed description and the accompanying drawing, of which.

DETAILED DESCRIPTION

Figure 1:
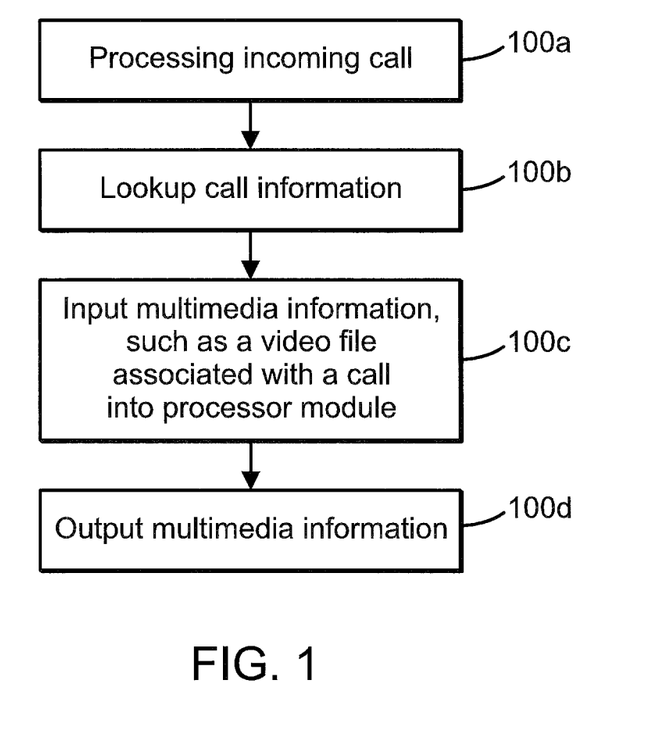
FIG. 1 shows a flow chart of a method according to an embodiment of the present invention.
Figure 2:
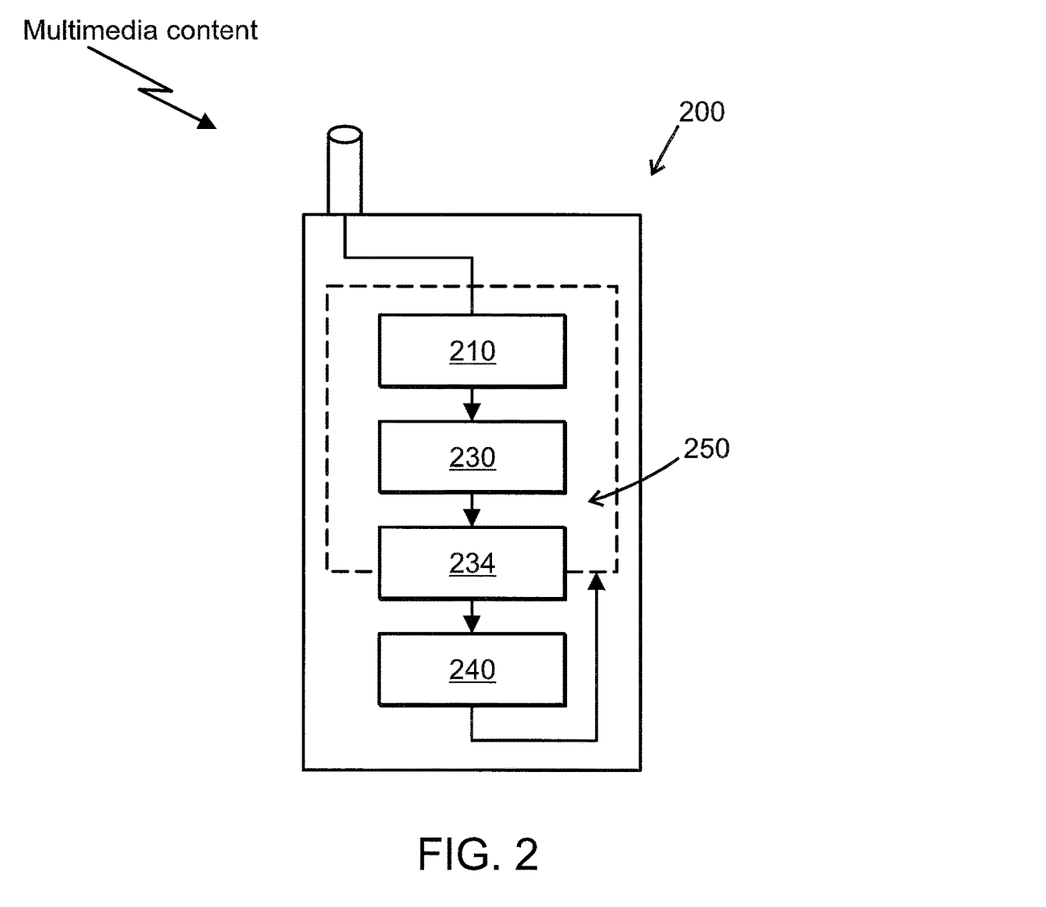
FIG. 2 shows a block schematic of a device according to an embodiment of the present invention.

Referring now to FIG. 1 and FIG. 2, of which FIG. 1 shows a flow chart of a method for generating multimedia information, such as a video clip including a ring tone in a mobile communication device (not shown in this figure) communicating with a mobile communication network (not shown in this figure) according to an embodiment of the present invention, the principle of the present invention will be described as follows. FIG. 1 shows how a call, which may be incoming, or outgoing, is processed. FIG. 2 shows a mobile communication device 200 according to an embodiment of the present invention for implementing the method shown in FIG. 1 and described as follows.

In a first step, a particular call, which may be incoming, or outgoing, is processed, step 100a via a communications interface 210 configured to process an incoming call from a caller and/or an outgoing call to a called party. When an incoming call is received and processed, the network (not shown, but which may comprise a, typically central, data base such as a multimedia server containing video content associated with a particular caller) can provide information about the caller (sometimes also referred to as a calling party). In some cases the network can provide only the telephone number or network address of the caller, but in other cases the network can also provide the name of the caller (none of these cases are shown in detail because they are well known). Then, in a second step, for providing multimedia information associated with a particular call, such as caller information for providing video ring tone information associated with a caller, the call is looked up, step 100b, in an analyzer 230. By means of this information, the mobile communication device 200 can look up additional information about the caller in the mobile communication device's memory 234. Then, in a third step, step 100c, the multimedia information associated with the particular call is input into a multimedia information processor module 240, which is typically the processor of the mobile communication device having suitable software downloaded for processing multimedia information. In a particular embodiment related to video ring tone generation, video ring tone information associated with a caller comprising parameters that control the actions to be taken based on the analysis of the signal is typically input into a ring tone module. Then in a fourth step, the multimedia information in dependence of the particular call, step 100d, is put out by means of the processor module 240, to a multimedia communication interface layer 250 configured to provide multimedia communication. The processor module 240 is configured to generate the multimedia communication interface layer 250 as an over-layer on top of or as an under-layer under any other application or screen of the mobile communication device.

In this way, typically instant, video messaging, picture messaging or text messaging can be provided, which is independent on other messaging such as sms, e-mail or the like. Since the communication interface layer is provided, typically by the mobile communication device's own processor executing a computer program application product, having computer program code means when executed by the processor, providing the method according to the invention is standalone, i. e. separated from the device's applications such as sms, e-mail or the like, or screen, the communication interface layer can be used for communicating directly with another party, or just receiving information without having to leave an application running, or entering a communication application such as sms to send a message.

According to an embodiment of the present invention, the multimedia communication interface layer 250 is configured to provide instant multimedia messaging as an overlay on top of any other application or screen of the mobile communication device. This is described in more detail in FIGS. 4A-C, to which are referred later on.

According to another embodiment of the present invention, the multimedia communication interface layer 250 is configured to provide instant multimedia messaging as an under-layer under any other application or screen of the mobile communication device. This embodiment is particularly useful for streaming information such as fashion news, or commercials to a user at proper intervals. The user may then use her/his mobile communication device as normal, but having the opportunity to look at fashion news simultaneously streamed under the conventional screen of the device as an under-layer of information.

According to an embodiment of the present invention, in the fourth step, step 100*d*, a particular video ring tone in dependence of a particular caller instead of an audio ring tone is put out, step 100*d*. Typically, once the mobile communication device determines which media should be played in response to the incoming call, it can retrieve the associated files and input the files into the ring tone module for processing and a video ring tone is output to notify the user of the mobile communication device of the incoming call.

Even if this embodiment only describes a video ringtone instead of a conventional audio ring tone, the invention is by no means limited to this. The invention can also be used for outputting a video clip instead of a SMS, MMS or alarm notification. In the case of SMS or MMS, of course the ID of the sender can be identified conventionally by the mobile communication device.

The invention according to this embodiment is based on a built-in store and features for selecting video instead of audio as regards conventional ring tone, personalized ring tone, SMS, MMS or alarm notification. The data base is also stored centrally, typically on the web such that a user having lost or switched his/her mobile communication device can re-load and use the application product once more, log-in to his/her account and re-use all already purchased video clips by downloading and using the same as before without having to purchase them once again.

Even if the same signal is used every time a call is received from the same caller, different video ring tones can still be achieved by varying the parameters that control the analysis of the signal and the parameters that control the actions to be taken based on the analysis of the signal. This is no explicitly shown.

FIG. 2 shows a mobile communication device 200 for generating multimedia information including video ring-tones, herein a smart phone. The device 200 comprises a communications interface 210 configured to receive and/or process an incoming call from a caller and video media over a mobile telephone network (not shown in this figure) or an outgoing call called by a user of the device 200. The device 200 further comprises an analyzer 230 for looking up call information for providing multimedia information associated with a particular call, including providing video ring tone information associated with a particular caller connected to (via mobile radio communication) the interface 210. The analyzer 230 is configured to process information about the call including caller, or called number if outgoing call, and to look up information, typically stored in a memory 234 having call information, such as multimedia information storage, such as a video ring tone information storage of contact associations such as the name of a particular call, or caller and which video content is associated with a particular call, or caller. The content associated with the call, or caller stored in the multimedia information storage, such as a video ring tone information storage can be contained within a conventional memory of the device 200 by means of suitable software therefore, typically downloaded as a computer application product providing the particular service to a user of the device 200. The multimedia processor module 240 receives the original signal from the call, for instance caller, or from an outgoing call, and based on the analysis of the signal from the analyzer 230, the multimedia processor module 240 outputs the multimedia information in dependence of the particular call to a multimedia communication interface layer 250 configured to provide multimedia communication. The processor module 240 is configured to generate the multimedia communication interface layer 250 as an over-layer on top of or as an under-layer under any other application or screen of the mobile communication 200.

According to an embodiment of the present invention, as described above with reference to FIG. 1, the multimedia communication interface layer 250 provided by the multimedia information processor module 240 is configured to provide instant multimedia messaging as an overlay on top of any other application or screen of the mobile communication device 200.

According to an alternative embodiment of the present invention, the mobile communication device 200, the multimedia communication interface layer 250 provided by the multimedia information processor module 240 is configured to provide instant multimedia messaging as an under-layer under of any other application or screen of the mobile communication device 200.

In the embodiment related to video ring tones, the analyzer 230 can analyze the caller's signal for any characteristics of interest providing information about which video media is associated with a particular caller. The video ring tone information associated with the caller is input into a ring tone module (not shown). The processor module 240 comprising a ring tone module receives the original signal from the caller and based on the analysis of the signal from the analyzer 230, the ring tone module outputs the video ring tone to the communication interface layer 250 instead of an audio ring tone.

The video content can be downloaded into the mobile communication device or recorded directly onto the device. For example, video content such as video files can be available for downloading from an online store, but can also be downloaded directly from some other source on the internet straight to the device. In some embodiments, the video content, such as files, are downloaded from or by means of a personal computer. For example, video files purchased from an online store can be stored on a personal computer and can be uploaded or downloaded onto the device via a direct connection such as when connecting a smart phone to a personal computer providing the media content. In some embodiments the video content can be recorded directly onto the device using the device's video recording features. This will be described as follows.

While FIG. 2 illustrates the multimedia content to be output and contact associations as part of the same memory 234, it should be appreciated that they may be part of one or more memories. Likewise, the inventive method can be performed with software or hardware and if software, it can be executed on one more processors including processors with specialized functions.

Figure 3A:
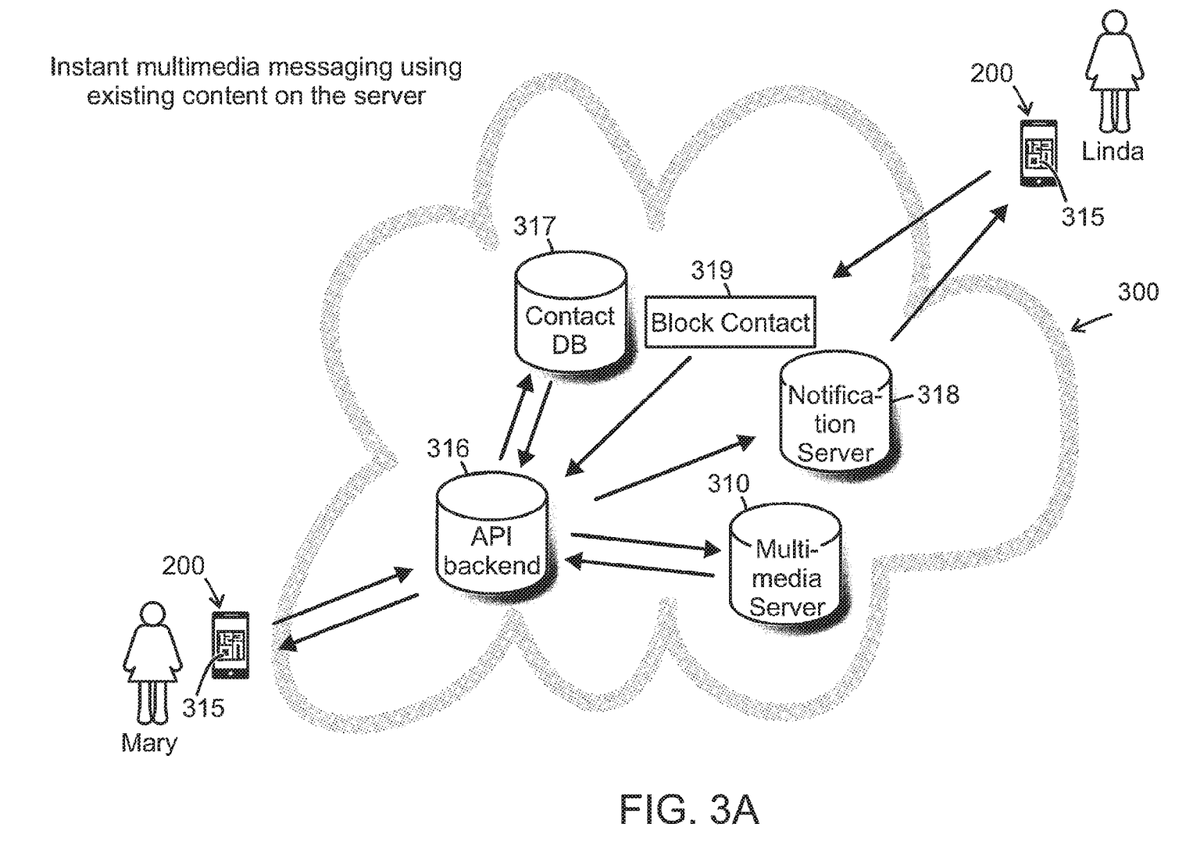
FIG. 3A shows instant multimedia messaging using existing content on multimedia server.
Figure 3B:
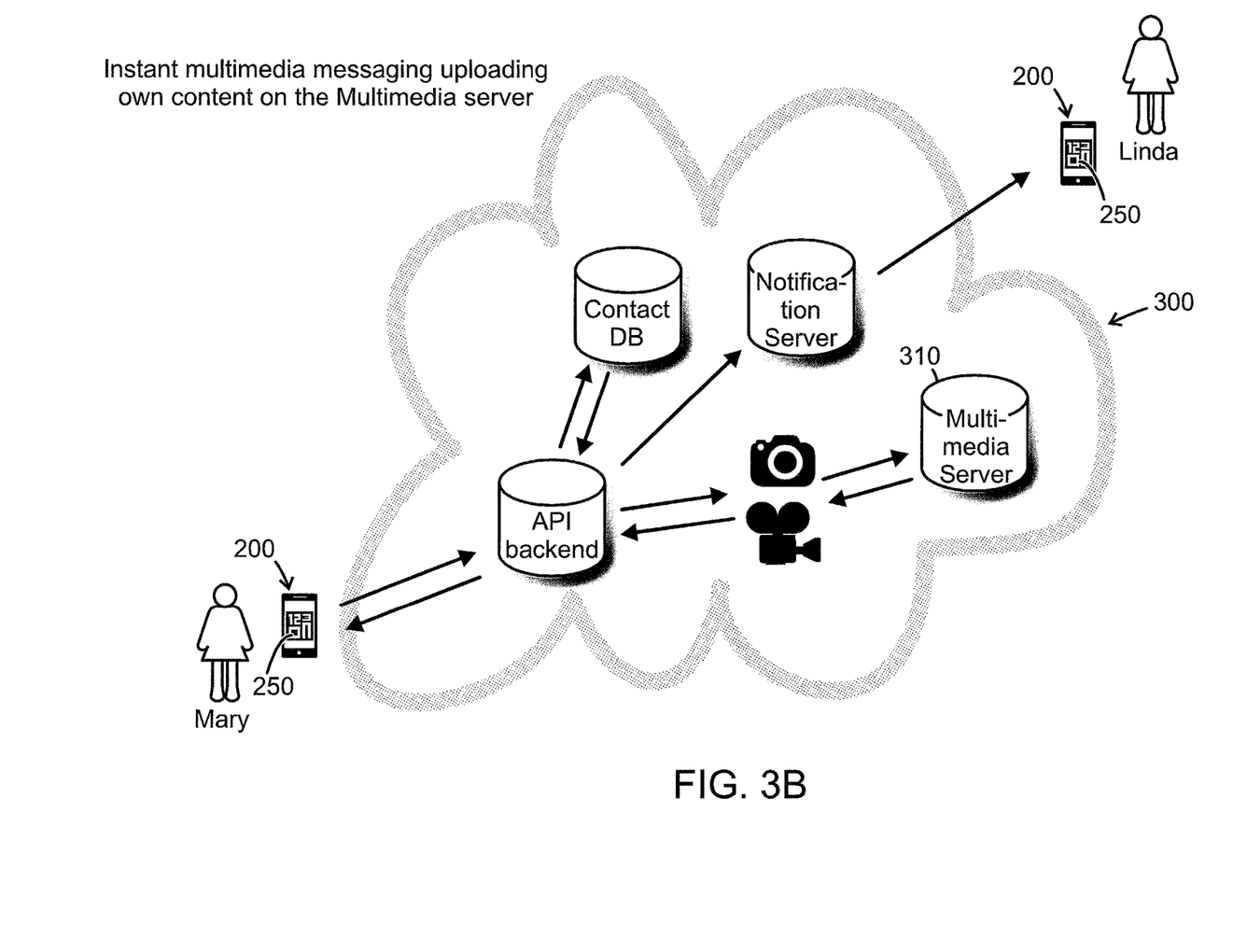
FIG. 3B shows instant multimedia messaging uploading own content on multimedia server.

Now is referred to FIG. 3A, which shows a system 300 for instant multimedia messaging using existing content on multimedia server according to an embodiment of the present invention. Content to be downloaded to the device 200 is provided by a multimedia server 310 containing a computer application program product (APP) 315 for downloading such that the device 200 can run the APP providing the invention when executed by the processor 240, possibly in communication with the multimedia server 310, which may also stream content when running the APP (illustrated by double-headed arrows). The system 300 typically also comprises an API backend 316, a contact data base 317 and a notification server 318, which may all be of conventional type. The system 300 may also optionally, according to an embodiment, comprise a block contact feature 319 for blocking an unwanted contact. For example, Linda may block Mary. The system also provides for users "Linda" and "Mary" to share their own content with each other, as shown in FIG. 3B, which shows instant multimedia messaging uploading own content on multimedia server; Linda may upload content to the multimedia server such as a video clip. Mary may then download the APP to be able to look at the video clip uploaded to the multimedia server 310 by Linda, for instance when Linda calls Mary. Linda and Mary may then communicate directly with each other (shown by the double-headed arrows) via the multimedia communication interface layer 250, provided as an over-layer on top or as an underlay under any other application or screen of the device 200 and via the system 300.

As follows, a number of typical implementations of the present invention according to the various embodiments described above and as follows, are listed and explained.
Push Videos:

By means of the present invention, a sender such as Mary, having a smart phone with the APP, is able to push videos to a receiver, such as Linda having a smart phone with the APP. A video is presented in Linda's smart phone when Mary calls Linda. Of course, senders may alternatively be non-physical persons such as a computer sending advertisements or any other information to a receiver allowing this.
Live Video Reactions:

By means of the present invention, a sender such as Mary, having a smart-phone with the APP, is able to push a video to a receiver, such as Linda having a smart phone with the APP. A video is selected and pushed by Mary via the APP. When the multimedia communication layer 250 shows the video, also the camera and microphone on Linda's device 200 is also triggered to start. Then Mary can while the video play, in live see and hear Linda's reaction on a streamed video on her device. The video can also be recorded and when the video is stopped playing, the recorded video (at Linda's device 200) also ends and is up-loaded automatically to the multimedia server 310.
Video at Outgoing Call:

The time period following having entered the numbers when calling and waiting for a receiver to answer is used to play videos during the period of time the caller waits for the receiver to answer or decides not to answer. This can be used for sending commercials thereby providing free or less costly communication fees for users, for instance from developing countries.
Videos for Targeted Advertising:

During an incoming call, the phone is taken over and a video clip is triggered to be played. This embodiment can be used for sending advertisements. By using analytics in combination with information from sources such as social media and localization it is possible to create custom made advertisement for global service providers locally also.

Figure 4A:
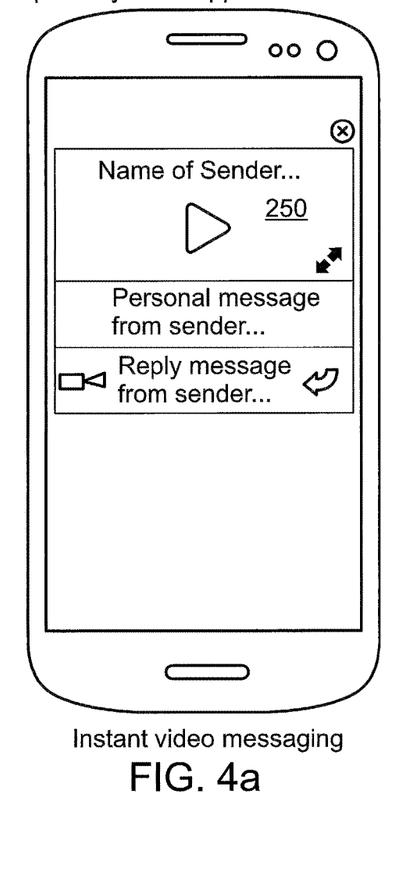
FIG. 4A shows instant video messaging.
Figure 4B:
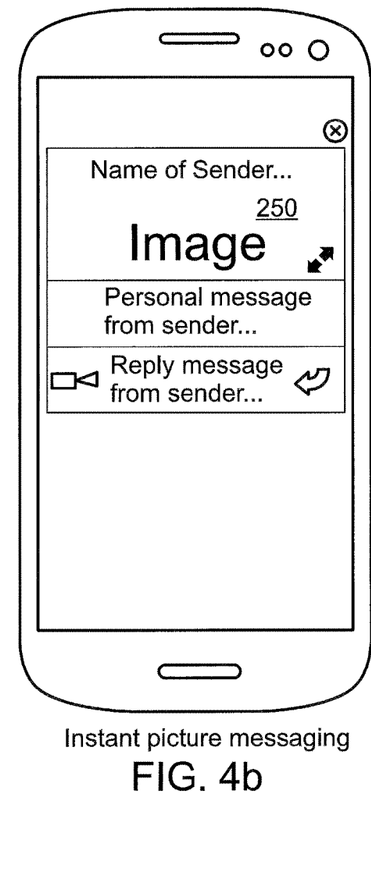
FIG. 4B shows instant picture messaging.
Figure 4C:
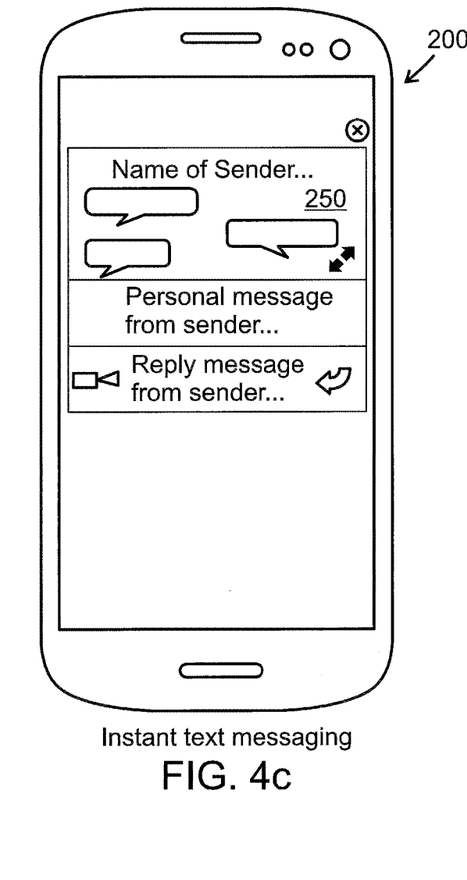
FIG. 4C shows instant text messaging.

FIG. 4A shows instant video messaging as described above with reference to FIGS. 1 and 2; FIG. 4B instant picture messaging; and FIG. 4C instant text messaging as an over-layer on top of any other application or home screen of the device 200 using the communication layer 250 described in this context.

Figure 5:
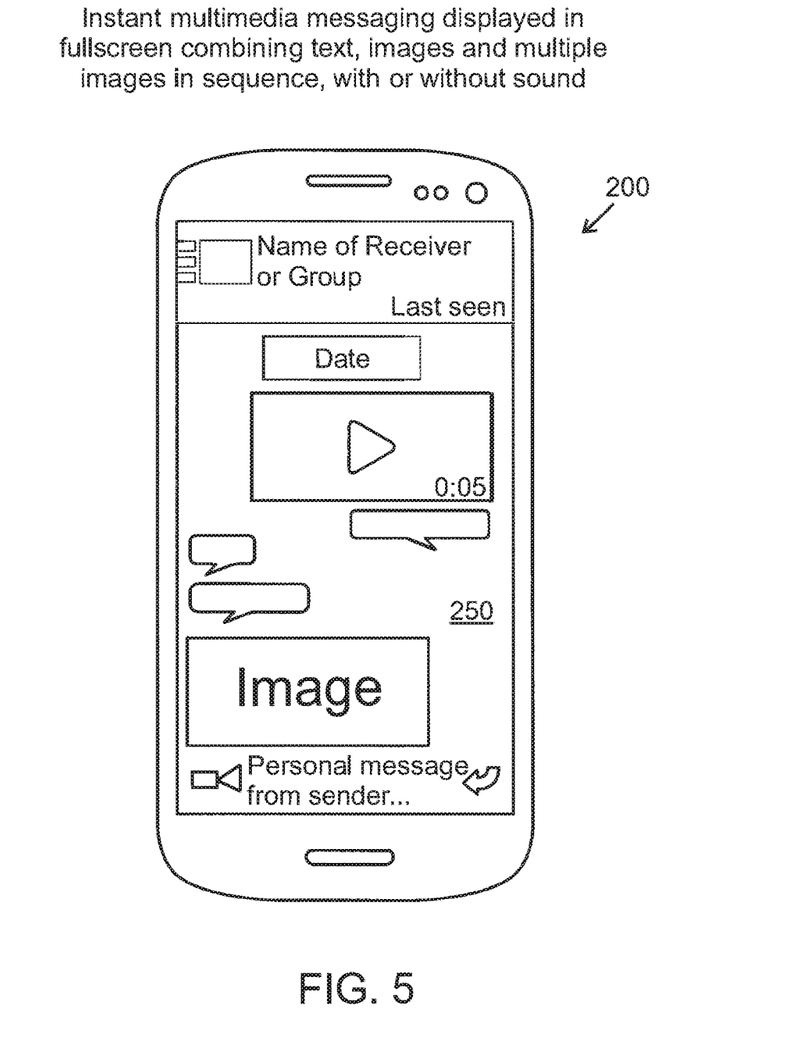
FIG. 5 shows instant multimedia messaging displayed in full-screen combining text, images and multiple images in sequence, with or without sound.

FIG. 5 shows instant multimedia messaging displayed in full-screen combining text, images and multiple images in sequence, with or without sound according to various embodiments of the present invention.

Figure 6A:
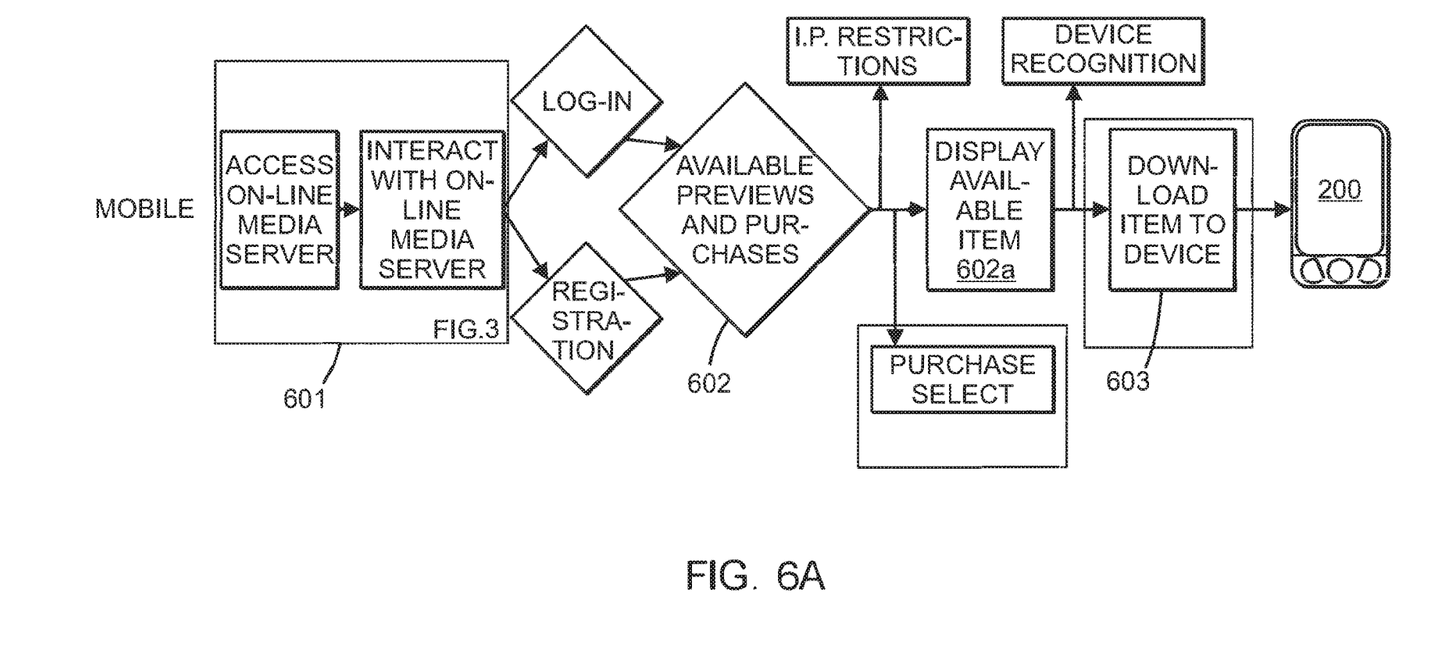
FIG. 6A shows a block schematic for illustrating a method according to an embodiment of the present invention for generating video ring-signals.

Now is referred to FIG. 6A showing a block schematic for illustrating a method according to an embodiment of the present invention. FIG. 6A shows a method for providing video-ringtone generation in a mobile communication device 200 by means of an external computer according an embodiment of the present invention.

Figure 6B:
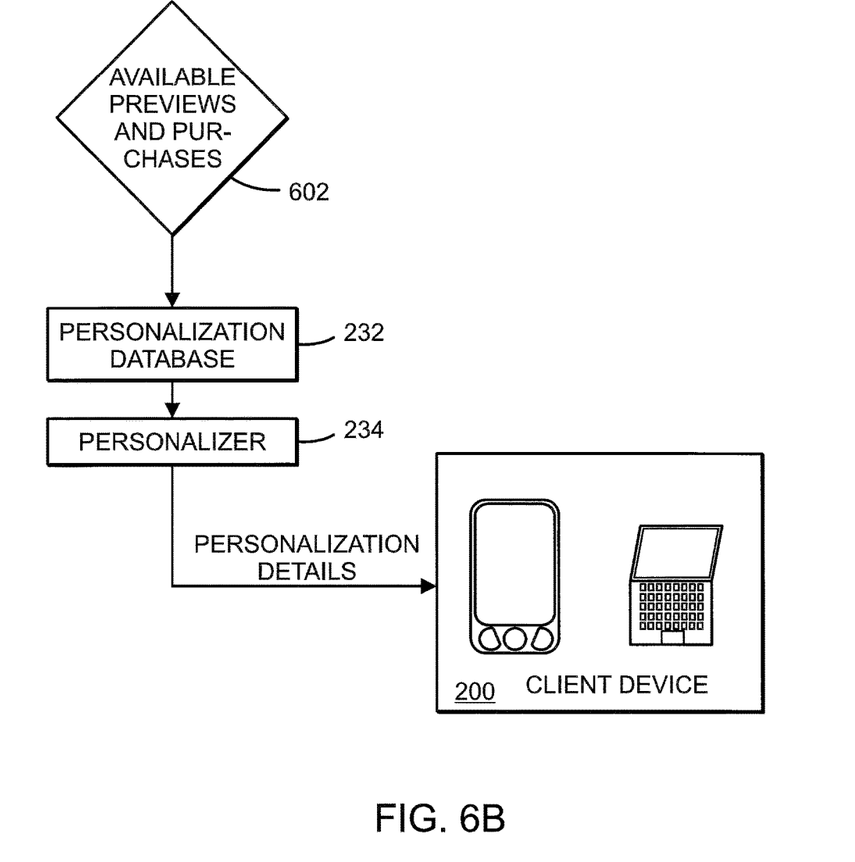
FIG. 6B shows a block schematic for illustrating how personalization is performed.
Figure 7:
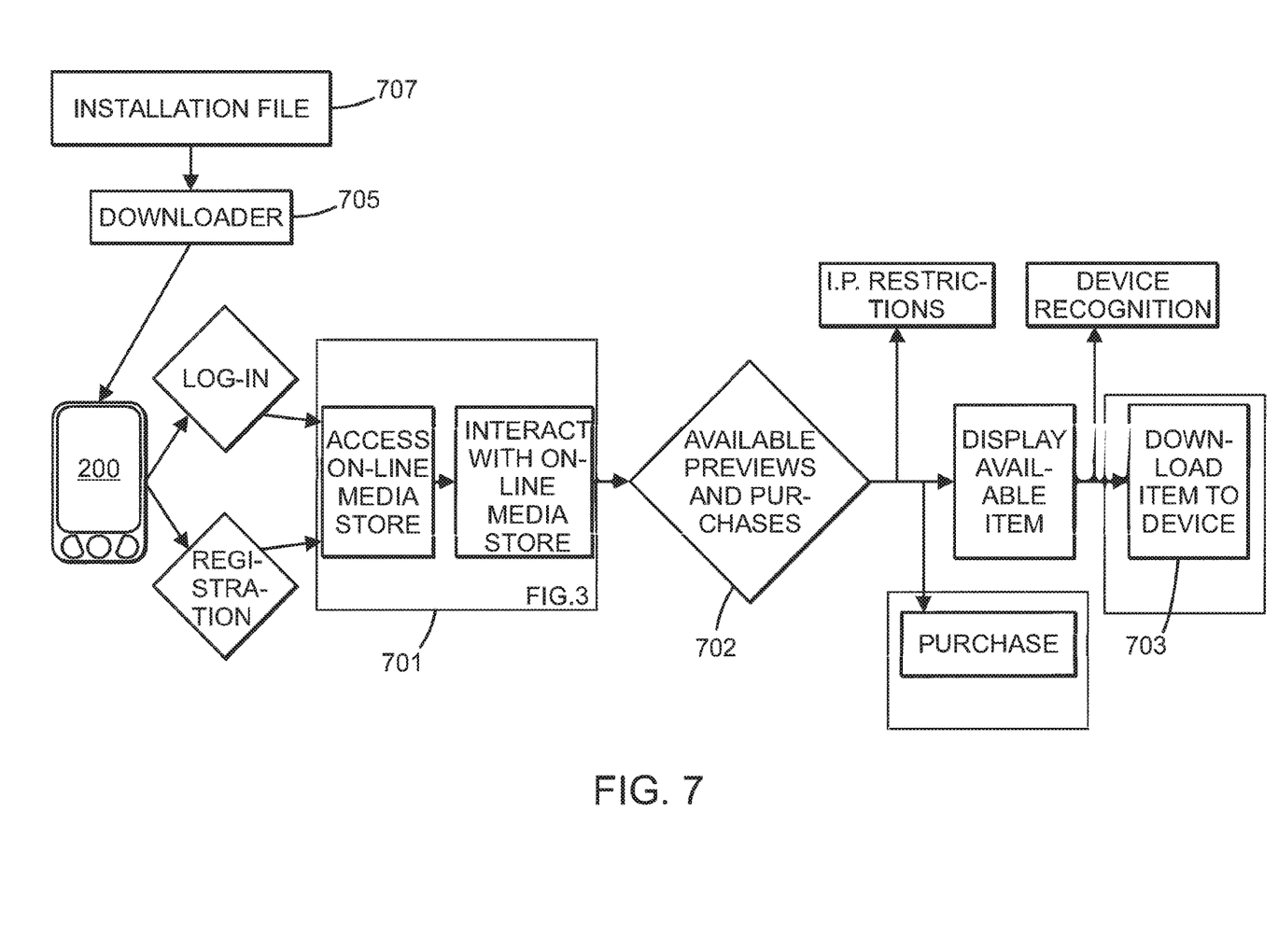
FIG. 7 shows a block schematic for illustrating a method according to an alternative embodiment of the present invention in relation to the embodiment shown and described in relation to FIG. 6A.

In a first step, video content items are accessed, step 601. This can be provided by accessing an on-line media store and interact with the same. Following log-in or registration, available previews and video content that can be purchased are displayed to the user, step 602. Available video content items are displayed and purchased taking I.P. restrictions into account. Thereafter typically device recognition is performed, i. e. selecting which type of mobile device will receive video content, for instance android, I-phone, Blackberry etc. Then video item is downloaded (or inputted in some other way) into the mobile communication device 200, followed by associating the particular video content item with a particular caller, step 603; and the mobile communication device 200 is provided with video ring tone information associated with a particular caller. This is described in more detail with reference to FIG. 6B In FIG. 6B is shown how available previews and purchases are transferred to a personalization data base 232 controlled by a personalizer 234 (corresponding to the memory in previous embodiments). The video content associated with the caller is stored in the video ring tone information storage 234 can be contained within a conventional memory of the device 200 by means of suitable software therefore Now is referred to FIG. 7 showing a block schematic for illustrating a method according to an alternative embodiment of the present invention. FIG. 7 shows a method for providing video-ringtone generation in a mobile communication device 200 by means of the device 200 itself according an embodiment of the present invention.

Following log-in or registration, video content items are accessed, step 701. This can be provided by accessing an on-line media store and interact with the same as described in relation to FIG. 6. Available video content items are displayed and purchased taking I.P. restrictions into account, step 702. Thereafter typically device recognition is performed, followed by down loading, step 703. This is provided by means of an installation file 707 and a downloader 705.

Purchase and payment are performed in a conventional way for e-commerce and will therefore not be further described herein since these procedures are well known.

In some embodiments a video file having a sequence of images is associated with a contact. The video file can be any video included compressed or uncompressed formats or even live video stored in RAM. The video file can also be a sequence of still images from a series of individual files that are collectively associated with the contact. Using this method, different video ringtones can be output each time a call is received from the contact.

While throughout the above description the technology has been described as pertaining to video ringtones for use on a mobile communication device, for example a mobile telephone, it is fully contemplated herein to be able to carry out the embodiments described herein on any mobile device capable of receiving incoming communications and having memory and processor means for implementing the inventive method. Accordingly, mobile communication device as it is mentioned above should be considered as no more than an embodiment of the presently described method and device.

The foregoing detailed description is intended to illustrate and provide easier understanding of the invention, and should not be construed as limitations. Alternative embodiments will become apparent to those skilled in the art without departing from the spirit and scope of the present invention.

What is claimed is:

1. A method for generating multimedia information in a mobile communication device, comprising the steps of:
    processing an incoming call from a caller or an outgoing call to a called party;
    in an analyzer, looking up call information for providing multimedia information associated with a particular call, the multimedia information including, with or without text, media other than text;
    inputting the multimedia information associated with said particular call into a multimedia information processor module; and
    using the multimedia information processor module to output the multimedia information in dependence of said particular call to a multimedia communication interface layer configured to provide multimedia communication, the multimedia information processor module being configured to generate the multimedia communication interface layer,
    wherein content to be downloaded to the mobile communication device is provided by a multimedia server when the call is received, and
    the multimedia information processor module is configured to generate the multimedia communication interface layer as an over-layer on top of, or as an under-layer under any other application or screen of the mobile communication device, and the multimedia communication interface layer is configured to provide instant multimedia messaging as an over-layer on top of any other application or screen of the mobile communication device or as an under-layer.

2. The method according to claim 1, wherein the multimedia communication interface layer is configured to provide instant multimedia messaging as an over-layer on top of any other application or screen of the mobile communication device.

3. The method according to claim 1, wherein the multimedia communication interface layer is configured to provide instant multimedia messaging as an under-layer on top of any other application or screen of the mobile communication device.

4. The method according to claim 3, wherein the multimedia communication interface layer is configured to display a multimedia message in full-screen, combining text, images and multiple images in sequence.

5. The method according to claim 4, wherein the multimedia communication interface layer is configured to display the multimedia message in full-screen, combining text, images and multiple images in sequence with sound.

6. The method according to claim 4, wherein the multimedia communication interface layer is configured to display the multimedia message in full-screen, combining text, images and multiple images in sequence without sound.

7. The method according to claim 2, wherein the multimedia communication interface layer is configured to display a multimedia message in full-screen, combining text, images and multiple images in sequence.

8. The method according to claim 1, wherein the multimedia communication interface layer is configured to display a multimedia message in full-screen, combining text, images and multiple images in sequence.

9. The method according to claim 6, wherein the method is implemented by a mobile communication device's processor executing computer program code.

10. The method according to claim 5, wherein the method is implemented by a mobile communication device's processor executing computer program code.

11. The method according to claim 4, wherein the method is implemented by a mobile communication device's processor executing computer program code.

12. The method according to claim 3, wherein the method is implemented by a mobile communication device's processor executing computer program code.

13. The method according to claim 2, wherein the method is implemented by a mobile communication device's processor executing computer program code.

14. The method according to claim 1, wherein the method is implemented by a mobile communication device's processor executing computer program code.

15. A mobile communication device, which comprises a communications interface configured to process an incoming call from a caller or an outgoing call to a called party via a mobile communication system, the mobile communication device further comprising
    an analyzer configured to look up call information for providing multimedia information associated with a particular call, the multimedia information including, with or without text, media other than text,
    a multimedia information processor module configured to output the multimedia information in dependence of said particular call to a multimedia communication interface layer configured to provide multimedia communication, the multimedia information processor module being configured to generate the multimedia communication interface layer,
    wherein content to be downloaded to the mobile communication device is provided by a multimedia server when the call is received, and
    the multimedia information processor module is configured to generate the multimedia communication interface layer as an over-layer on top of, or as an under-layer under any other application or screen of the mobile communication device, and the multimedia communication interface layer is configured to provide instant multimedia messaging as an over-layer on top of any other application or screen of the mobile communication device or as an under-layer.

16. The mobile communication device according to claim 15, wherein the multimedia communication interface layer provided by the multimedia information processor module is configured to provide instant multimedia messaging as an overlay on top of any other application or screen of the mobile communication device.

17. The mobile communication device according to claim 15, wherein the multimedia communication interface layer provided by the multimedia information processor module is configured to provide instant multimedia messaging as an underlay under of any other application or screen of the mobile communication device.

* * * * *